(12) United States Patent
Yamamoto et al.

(10) Patent No.: US 8,492,298 B2
(45) Date of Patent: Jul. 23, 2013

(54) OPTICAL MATERIAL AND OPTICAL ELEMENT

(75) Inventors: Kiyoshi Yamamoto, Yokohama (JP); Michio Endo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 13/058,347

(22) PCT Filed: Sep. 24, 2009

(86) PCT No.: PCT/JP2009/067120
§ 371 (c)(1),
(2), (4) Date: Feb. 10, 2011

(87) PCT Pub. No.: WO2010/035881
PCT Pub. Date: Apr. 1, 2010

(65) Prior Publication Data
US 2011/0143909 A1    Jun. 16, 2011

(30) Foreign Application Priority Data
Sep. 26, 2008 (JP) ................... 2008-249026

(51) Int. Cl.
*C03C 3/066* (2006.01)
*C03C 3/068* (2006.01)

(52) U.S. Cl.
USPC .................. 501/79; 501/78; 501/51

(58) Field of Classification Search
USPC .......................... 501/78, 79, 50, 51
See application file for complete search history.

(56) References Cited

U.S. PATENT DOCUMENTS

| | | | |
|---|---|---|---|
| 4,226,627 A | 10/1980 | Inoue et al. | |
| 4,756,737 A | 7/1988 | Yoshimura et al. | |
| 5,822,134 A | 10/1998 | Yamamoto et al. | |
| 6,003,338 A | 12/1999 | Yamamoto et al. | |
| 6,251,813 B1 * | 6/2001 | Sato | 501/78 |
| 7,015,164 B2 | 3/2006 | Kasuga et al. | |
| 7,087,543 B2 * | 8/2006 | Kasuga et al. | 501/79 |
| 2006/0079390 A1 * | 4/2006 | Kasuga et al. | 501/78 |
| 2007/0232477 A1 * | 10/2007 | Fujiwara | 501/50 |
| 2008/0188368 A1 * | 8/2008 | Tsai et al. | 501/78 |
| 2008/0318758 A1 * | 12/2008 | Imakita et al. | 501/51 |
| 2009/0069162 A1 * | 3/2009 | Shimizu | 501/4 |
| 2010/0081561 A1 | 4/2010 | Nakata et al. | |

FOREIGN PATENT DOCUMENTS

| | | |
|---|---|---|
| CN | 101163648 A | 4/2008 |
| EP | 0 544 494 A1 | 6/1993 |
| JP | 2000-16831 A | 1/2000 |
| JP | 2001-130924 A | 5/2001 |
| JP | 2006-321710 A | 11/2006 |
| WO | 2007/097345 A1 | 8/2007 |
| WO | WO 2007097345 A1 * | 8/2007 |

OTHER PUBLICATIONS

Machine Translation of JP 2001-130924, May 15, 2001.*
Apr. 7, 2011 International Preliminary Report on Patentability in International Patent Appln. No. PCT/JP2009/067120.
Dec. 28, 2009 International Search Report and Written Opinion in PCT/JP2009/067120.
Dec. 3, 2012 Chinese Official Action in Chinese Patent Appln. No. 200980136933.0.

* cited by examiner

*Primary Examiner* — Karl Group
*Assistant Examiner* — Elizabeth A Bolden
(74) *Attorney, Agent, or Firm* — Fitzpatrick, Cella, Harper & Scinto

(57) ABSTRACT

Provided is an optical glass having homogeneous optical characteristics such that striae and devitrification hardly occur at the time of producing a gob. The optical glass includes cationic components having the following composition, provided that a total of the cationic components is 95 cat %, and has a refractive index (nd) of 1.6 or more and less than 1.7 and an Abbe number (vd) of 50 or more and 56 or less, $Si^{4+}$ 3 cat % or more and 13 cat % or less
$B^{3+}$ 40 cat % or more and 55 cat % or less
$La^{3+}$ 4 cat % or more and 9 cat % or less
$Ca^{2+}$ 6 cat % or more and 12 cat % or less
$Li^{+}$ 11 cat % or more and 18 cat % or less
$Zn^{2+}$ 6 cat % or more and 12 cat % or less
$Zr^{4+}$ 1 cat % or more and 4 cat % or less
provided that $Si^{4+}/B^{3+}$ is 0.05 or more and 0.3 or less, and $Li^{+}/Zn^{2+}$ is 1.3 or more and 2.0 or less.

8 Claims, 1 Drawing Sheet

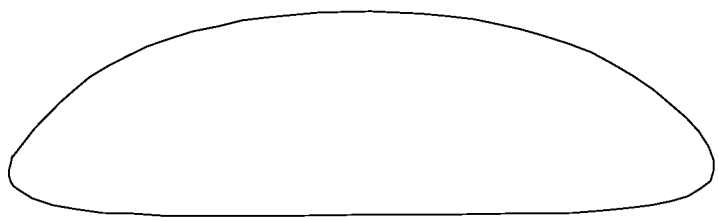

OPTICAL MATERIAL AND OPTICAL ELEMENT

TECHNICAL FIELD

The present invention relates to an optical glass and an optical element, in particular, to a glass lump (gob) for precision press molding, an optical glass, and an optical element each having high refractive index, low dispersibility, and low glass transition point (Tg). Furthermore, the optical glass of the present invention has homogeneous optical characteristics such that striae and devitrification hardly occur at the time of producing a gob, and hence can be utilized as, for example, an optical pick-up lens of a camera, a digital camera, VTR, DVD, or the like.

BACKGROUND ART

As glasses having optical constants of a refractive index (nd) of 1.60 or more and less than 1.70 and an Abbe number (vd) of 50 or more and 56 or less, there are given SSK and LAK, the names of which are specified in Schott catalog. The glass transition point (Tg) of SSK and LAK is 600° C. or higher. In precision press molding, in which a lens is directly produced by press molding of softened glass, the molding temperature becomes 700° C. or higher. In the case where the temperature at the time of molding is high as described above, the reaction between the glass and the film of a molding die has become active, and sometimes, film detachment has occurred to degrade the productivity. Accordingly, in recent years, there have been developed glass having low Tg and glass having low yield point (At) each of which can lower the temperature at the time of being molded as glass for precision press molding.

Under the above circumstances, there are known various compositions as the glass for precision press molding, such as those described in U.S. Pat. Nos. 6,251,813, 7,015,164, and 4,226,627, and European Patent No. 0544494.

DISCLOSURE OF THE INVENTION

However, when liquidus temperature (L.T.) rises due to lowered Tg, there have been problems of occurrence of crystals (devitrification) or striae in a glass lump (gob) for precision press molding, and the like.

In conventional technology, there have been the following three objects: first, to suppress the occurrence of devitrification or striae in a gob; second, to suppress the reaction between the film of a molding die and the glass caused by lowered Tg; and third, to suppress the specific gravity separation of mixed powder, to thereby obtain a homogeneous gob formed of as small a number of components as possible.

The glass described in U.S. Pat. No. 6,251,813 has a high liquidus temperature of 1,000° C. or higher, and it is difficult to form a gob. The glass described in U.S. Pat. No. 7,015,164 has a small amount of $B_2O_3$ with respect to that of $SiO_2$, and hence exhibits high crystallization tendency. The glass described in U.S. Pat. No. 4,226,627 does not contain ZnO, which is an important chemical element for lowering liquidus temperature and Tg. Therefore, the glass has relatively high liquidus temperature, and is difficult to be formed into a gob. The glass described in European Patent No. 0544494 contains $Ta_2O_5$, which is an expensive chemical element, and hence has an unsuitable composition for a general-purpose optical glass.

In general, in order to avoid devitrification, it is effective to increase entropy and to increase the kinds of components that suppress precipitation of crystals. However, there has been a problem that, when the kinds of trace amount components increase due to the increase in the kinds of components, specific gravity separation occurs at the time of mixing powder and it is difficult to obtain homogeneous glass after dissolution.

The present invention has been accomplished in view of the above-mentioned background art, and the present invention provides an optical glass having homogeneous optical characteristics such that striae and devitrification hardly occur at the time of producing a gob.

Furthermore, the present invention provides an optical element obtained by subjecting the optical glass to homogeneous precision press molding.

A first optical glass to solve the above-mentioned problems includes cationic components having the following composition, provided that a total of the cationic components is 95 cat %, and has a liquidus temperature of 800° C. or higher and lower than 1,000° C.:

$Si^{4+}$ 3 cat % or more and 13 cat % or less
$B^{3+}$ 40 cat % or more and less than 55 cat %
$La^{3+}$ 4 cat % or more and 9 cat % or less
$Ca^{2+}$ 6 cat % or more and 12 cat % or less
$Li^+$ 11 cat % or more and 18 cat % or less
$Zn^{2+}$ 6 cat % or more and 12 cat % or less
$Zr^{4+}$ 1 cat % or more and 4 cat % or less
$Y^{3+}$ 0 cat % or more and 0.5 cat % or less
$Gd^{3+}$ 0 cat % or more and less than 0.3 cat %
$Ba^{2+}$ 0 cat % or more and 0.5 cat % or less
$Mg^{2+}$ 0 cat % or more and 2 cat % or less
$Ge^{4+}$ 0 cat % or more and 1 cat % or less
$Na^+ + K^+$ 0 cat % or more and 2 cat % or less
$W^{6+}$ 0 cat % or more and 0.5 cat % or less
$Ta^{5+}$ 0 cat % or more and 0.5 cat % or less
$Sb^{3+}$ 0 cat % or more and 0.5 cat % or less
$H^+$ 0 cat % or more and 10 cat % or less
provided that $Si^{4+}/B^{3+}$ is 0.05 or more and 0.3 or less, and $Li^+/Zn^{2+}$ is 1.3 or more and 2.0 or less.

Furthermore, a second optical glass to solve the above-mentioned problems includes cationic components having the following composition, provided that a total of the cationic components is 100 cat %, and has a refractive index (nd) of 1.6 or more and less than 1.7 and an Abbe number (vd) of 50 or more and 56 or less:

$Si^{4+}$ 3 cat % or more and 13 cat % or less
$B^{3+}$ 40 cat % or more and 55 cat % or less
$La^{3+}$ 4 cat % or more and 9 cat % or less
$Ca^{2+}$ 6 cat % or more and 12 cat % or less
$Li^+$ 11 cat % or more and 18 cat % or less
$Zn^{2+}$ 6 cat % or more and 12 cat % or less
$Zr^{4+}$ 1 cat % or more and 4 cat % or less
$H^+$ 0 cat % or more and 10 cat % or less
provided that $Si^{4+}/B^{3+}$ is 0.05 or more and 0.3 or less, and $Li^+/Zn^{2+}$ is 1.3 or more and 2.0 or less.

Further features of the present invention will become apparent from the following description of exemplary embodiments with reference to the attached drawings.

BRIEF DESCRIPTION OF THE DRAWING

FIG. 1 is a cross-sectional view illustrating an optical element of the present invention.

BEST MODE FOR CARRYING OUT THE INVENTION

Hereinafter, the present invention is described in detail.

An optical glass according to the present invention includes cationic components having the following composition, provided that a total of the cationic components is 95 cat %, and has a liquidus temperature of 800° C. or higher and lower than 1,000° C.:

$Si^{4+}$ 3 cat % or more and 13 cat % or less
$B^{3+}$ 40 cat % or more and less than 55 cat %
$La^{3+}$ 4 cat % or more and 9 cat % or less
$Ca^{2+}$ 6 cat % or more and 12 cat % or less
$Li^{+}$ 11 cat % or more and 18 cat % or less
$Zn^{2+}$ 6 cat % or more and 12 cat % or less
$Zr^{4+}$ 1 cat % or more and 4 cat % or less
$Y^{3+}$ 0 cat % or more and 0.5 cat % or less
$Gd^{4+}$ 0 cat % or more and less than 0.3 cat %
$Ba^{2+}$ 0 cat % or more and 0.5 cat % or less
$Mg^{2+}$ 0 cat % or more and 2 cat % or less
$Ge^{4+}$ 0 cat % or more and 1 cat % or less
$Na^{+}+K^{+}$ 0 cat % or more and 2 cat % or less
$W^{6+}$ 0 cat % or more and 0.5 cat % or less
$Ta^{5+}$ 0 cat % or more and 0.5 cat % or less
$Sb^{3+}$ 0 cat % or more and 0.5 cat % or less
$H^{+}$ 0 cat % or more and 10 cat % or less provided that $Si^{4+}/B^{3+}$ is 0.05 or more and 0.3 or less, and $Li^{+}/Zn^{2+}$ is 1.3 or more and 2.0 or less.

Furthermore, another optical glass according to the present invention includes cationic components having the following composition, provided that a total of the cationic components is 100 cat %, and has a refractive index (nd) of 1.6 or more and less than 1.7 and an Abbe number (vd) of 50 or more and 56 or less:

$Si^{4+}$ 3 cat % or more and 13 cat % or less
$B^{3+}$ 40 cat % or more and 55 cat % or less
$La^{3+}$ 4 cat % or more and 9 cat % or less
$Ca^{2+}$ 6 cat % or more and 12 cat % or less
$Li^{+}$ 11 cat % or more and 18 cat % or less
$Zn^{2+}$ 6 cat % or more and 12 cat % or less
$Zr^{4+}$ 1 cat % or more and 4 cat % or less
$H^{+}$ 0 cat % or more and 10 cat % or less provided that $Si^{4+}/B^{3+}$ is 0.05 or more and 0.3 or less, and $Li^{+}/Zn^{2+}$ is 1.3 or more and 2.0 or less.

In the above composition, it is preferred that $Si^{4+}/B^{3+}$ be 0.05 or more and 0.3 or less, $Li^{+}/Zn^{2+}$ is 1.3 or more and 2.0 or less, and the liquidus temperature be 800° C. or higher and lower than 1,000° C. Furthermore, it is preferred that the refractive index (nd) be 1.6 or more and less than 1.7 and the Abbe number (vd) be 50 or more and 56 or less.

The optical glass of the present invention preferably does not contain, in the cationic components, $As^{3+}$, $Pb^{2+}$, $Cd^{2+}$, and $F^{-}$ which are toxic from a viewpoint of an environmental load.

In the present invention, "cat %" represents "cation %" and shows the content of each cationic component in terms of cation %. The total of the respective cationic components is 100 cat %.

Next, each of the cationic components contained in the optical glass of the present invention are described.

In the optical glass of the present invention, an essential component among cationic components means a component whose content is more than 0 cat %. As the cationic components which are essential components, the optical glass includes $Si^{4+}$, $B^{3+}$, $La^{3+}$, $Ca^{2+}$, $Li^{30}$, $Zn^{2+}$, $Zr^{4+}$, and $H^{+}$.

Furthermore, an optional component among cationic components means a component which is added after the optical glass has been formed with essential components. As the cationic components which are optional components, the optical glass includes $Y^{3+}$, $Gd^{3+}$, $Ba^{2+}$, $Mg^{2+}$, $Ge^{4+}$, $Na^{30}$, $K^{+}$, $W^{6+}$, $Ta^{5+}$, and $Sb^{3+}$.

Hereinafter, the content of each of the cationic components is described.

$Si^{4+}$ functions as a glass network-forming component and has a function of stabilizing the glass. It is desired that the content of $Si^{4+}$ be 3 cat % or more and 13 cat % or less and preferably 5 cat % or more and 11 cat % or less. When the content is less than 3 cat %, the liquid-phase viscosity decreases and the glass becomes unstable. It is not preferred that the content be more than 13 cat %, because dissolution temperature and Tg rise.

$B^{3+}$, in the same manner as $Si^{4+}$, functions as a glass network-forming component and has a function of stabilizing the glass. It is desired that the content of $B^{3+}$ be 40 cat % or more and less than 55 cat % (excluding 55%) and preferably 45 cat % or more and 53 cat % or less. It is not preferred that the content be less than 40 cat %, because the devitrification tendency increases, and that the content be 55 cat % or more, because the refractive index lowers and target properties cannot be obtained.

Here, the ratio of $Si^{4+}$ to $B^{3+}$ is particularly important in terms of stabilizing the glass. When the ratio $Si^{4+}/B^{3+}$ is less than 0.05, the viscosity at the liquidus temperature decreases. As a result, striae occur, and homogeneous glass cannot be obtained. Furthermore, when the ratio $Si^{4+}/B^{3+}$ is more than 0.3, the devitrification tendency increases and the liquidus temperature becomes high. In addition, the coloring of the glass also increases due to the rise in the dissolution temperature. Therefore, the ratio of $Si^{4+}$ to $B^{3+}$, $Si^{4+}/B^{3+}$, is preferably set to 0.05 or more and 0.3 or less.

$La^{3+}$ is an essential component which imparts a high refractive index and a low dispersion property. It is desired that the content of $La^{3+}$ be 4 cat % or more and 9 cat % or less and more preferably 5 cat % or more and 8 cat % or less. When the content is less than 4 cat %, target optical constants cannot be obtained. Furthermore, it is not preferred that the content be more than 9 cat %, because the stability of the glass decreases.

It is desired that the content of $Ca^{2+}$ be 6 cat % or more and 12 cat % or less and more preferably 8 cat % or more and 11 cat % or less. When the content is less than 6 cat %, the stability of the glass decreases. Furthermore, it is not preferred that the content be more than 12 cat %, because the dissolution property is degraded.

$Li^{+}$ is an essential component for lowering the glass transition point. It is desired that the content of $Li^{+}$ be 11 cat % or more and 18 cat % or less and preferably 12 cat % or more and 16 cat % or less. It is not preferred that the content be less than 11 cat %, because the effect of lowering the glass transition point cannot be obtained, and it is also not preferred that the content be more than 18 cat %, because the stability of the glass decreases.

$Zn^{2+}$ is an essential component for lowering the glass transition point. It is desired that the content of $Zn^{2+}$ be 6 cat % or more and 12 cat % or less and preferably 7 cat % or more and 10 cat % or less. It is not preferred that the content be less than 6 cat %, because the effect of lowering the glass transition point cannot be obtained, and it is also not preferred that the content be more than 12 cat %, because the stability of the glass decreases.

Here, $Li^{+}$ has a larger effect on lowering the glass transition point compared with $Zn^{2+}$. On the other hand, $Zn^{4+}$ has a higher contribution to the stability of the glass compared with $Li^{+}$. Accordingly, in order to obtain glass having low glass transition point and high glass stability, the provision of which is an object of the present invention, it is preferred that $Li^+/Zn^{2+}$ be 1.3 or more and 2.0 or less.

$Zr^{4+}$ is a component which imparts a high refractive index and a high dispersibility. It is desired that the content of $Zr^{4+}$ be 1 cat % or more and 4 cat % or less and more preferably 1.5 cat % or more and 3 cat % or less. When the content is less than 1 cat %, a target refractive index cannot be obtained, and when the content is more than 4 cat %, the Abbe number becomes small and hence, target properties cannot be obtained. Furthermore, the stability of the glass also improves when the content is set to 1 cat % or more and 4 cat % or less.

When there is used the glass having a total amount of 98% or more of $Si^{4+}$, $B^{3+}$, $La^{3+}$, $Ca^{2+}$, $Zn^{2+}$, $Li^+$, and $Zr^{4+}$, which are included in the above ranges, homogeneous optical glass having a liquidus temperature of 1,000° C. or lower can be obtained. In addition, the following components can be contained therein in a range which does not largely impair the properties.

Regarding $Y^{3+}$ and $Gd^{3+}$, 0 cat % or more and 0.5 cat % or less of $Y^{3+}$ and 0 cat % or more and less than 0.3 cat % of $Gd^{3+}$ can be added to the glass. When the content of $Y^{3+}$ is 0.5 cat % or more, the difference between a specific gravity of $La^{3+}$ and a specific gravity of $Y^{3+}$ becomes large, and hence, the specific gravity separation of powder easily occurs at the time of mixing powder. Furthermore, $Gd^{3+}$ and $Y^{3+}$ are expensive as raw materials compared with $La^{3+}$.

Still further, when 0.3 cat % or more of Ge is added to the glass, the specific gravity of the glass becomes large. Accordingly, the content of $Y^{3+}$ was limited to 0 cat % or more and 0.5 cat % or less and the content of $Gd^{3+}$ was limited to 0 cat % or more and less than 0.3 cat %.

Regarding $Ba^{2+}$ and $Mg^{2+}$, 0 cat % or more and 0.5 cat % or less of $Ba^{2+}$ and 0 cat % or more and 2 cat % or less of $Mg^{2+}$ can be added to the glass, by substitution of $Ba^{2+}$ and $Mg^{2+}$ for $Ca^{2+}$. When the contents of $Ba^{2+}$ and $Mg^{2+}$ are more than 0.5 cat % and more than 2 cat %, respectively, both the dissolution property and the stability of the glass are degraded. Accordingly, the content of $Ba^{2+}$ was limited to 0 cat % or more and 0.5 cat % or less and the content of $Mg^{2+}$ was limited to 0 cat % or more and 2 cat % or less.

$Ge^{4+}$ is a glass network-forming component, and is a component for enhancing the stability of the glass. The content of $Ge^{4+}$ is 0 cat % or more and 1 cat % or less. When the content is more than 1 cat %, the dissolution property is degraded. Furthermore, $Ge^{4+}$ is extremely expensive as a raw material.

$Na^+$ and $K^+$ each have the effect of lowering the glass transition point, but when more than 2 cat % of $Na^+$ and $K^+$ are added to the glass, the stability of the glass is remarkably decreased. Accordingly, the content of $Na^+ + K^+$ was limited to 0 cat % or more and 2 cat % or less.

$W^{6+}$ is a component which imparts a high refractive index, but when the content thereof is more than 0.5 cat %, the Abbe number becomes small and hence, target optical constants cannot be obtained, and further, the glass tends to be colored. Accordingly, the content of $W^{6+}$ was limited to 0 cat % or more and 0.5 cat % or less.

$Ta^{5+}$ is a component which imparts a high refractive index and a low dispersion property. However, when the content thereof is more than 0.5 cat %, the dissolution property is degraded. Furthermore, the glass transition point rises. Accordingly, the content of $Ta^{5+}$ was limited to 0 cat % or more and 0.5 cat % or less.

$S^{4+}$ is used as a refining agent for removing bubbles in the glass. The addition of more than 0.5 cat % thereof to the glass not only decreases the stability of the glass, but also increases the coloring thereof, and hence, the content of $S^{4+}$ was limited to 0 cat % or more and 0.5 cat % or less.

In the optical glass of the present invention, the above cationic components and anionic components are contained. Examples of the anionic components include $O^{2-}$, $OH^-$, $NO_x$ (X represents 1 to 3), and $SO_4^{2-}$.

The content of the cationic components in the optical glass of the present invention is 100%, and the content of the anionic components in the optical glass of the present invention is 100%.

As a raw material used for producing the optical glass of the present invention, an oxide may be exemplified. The raw material is not limited to the above substances. Consequently, the raw material may be selected, in accordance with the conditions of glass production, from known materials such as an oxide, a hydroxide, a carbonate, a nitrate, and sulfate.

A production method for the optical glass of the present invention includes, for example, a melting method involving melting raw materials in a Pt crucible and cooling the resultant, and the optical glass of the present invention includes a gob produced in a plate form or produced by floating by gas.

Furthermore, the present invention provides an optical element including the optical glass.

Examples of the optical element of the present invention include an optical pick-up lens of a camera, digital camera, VTR, DVD, or the like, a prism, and a diffraction grating.

The optical element of the present invention can be obtained by subjecting the optical glass to homogeneous precision press molding. A production method for the optical element includes, for example, a molding method involving heating and softening the glass and molding the resultant with a precision die.

EXAMPLES

Hereinafter, the present invention is described specifically by way of examples.

Raw materials each having composition as shown in Tables 1 to 3 were melted in a Pt crucible at 1,100° C. to 1,300° C. for 1 hour to 6 hours. After that, the resultant was allowed to flow into a die, to thereby produce a block.

The glass raw materials of Example 1 to Example 12 and Comparative Example 1 to Comparative Example 3 were weighed and mixed, and the mixture was melted under the conditions described above. After the mixture was melted, refined, and stirred to be homogenized, the resultant was received by a die through a platinum pipe heated to 800° C. to 1,100° C., followed by cooling, to thereby obtain an optical element (gob) for precision press molding illustrated in FIG. 1.

TABLE 1

| | | | | | | (Weight %) |
| | Example 1 | Example 2 | Example 3 | Example 4 | Example 5 | Example 6 |
|---|---|---|---|---|---|---|
| $B_2O_3$ | 34.50 | 30.00 | 36.00 | 33.74 | 36.30 | 33.00 |
| $La_2O_3$ | 24.50 | 26.00 | 22.00 | 21.50 | 20.50 | 24.00 |
| $Y_2O_3$ | 0.00 | 0.00 | 0.00 | 0.00 | 0.00 | 0.00 |
| $SiO_2$ | 7.50 | 12.50 | 8.00 | 8.20 | 8.50 | 8.00 |
| $Li_2O$ | 4.00 | 4.00 | 4.50 | 4.00 | 4.30 | 4.00 |
| CaO | 9.00 | 10.00 | 10.50 | 10.00 | 10.40 | 9.00 |
| ZnO | 15.50 | 13.50 | 13.50 | 15.80 | 13.80 | 15.50 |
| $Cd_2O_3$ | 0.00 | 0.00 | 0.00 | 0.00 | 0.00 | 0.00 |
| $ZrO_2$ | 4.00 | 4.00 | 5.50 | 6.45 | 6.20 | 6.50 |
| $Na_2O$ | 0.00 | 0.00 | 0.00 | 0.00 | 0.00 | 0.00 |
| $K_2O$ | 0.00 | 0.00 | 0.00 | 0.00 | 0.00 | 0.00 |
| Na + K | 0.00 | 0.00 | 0.00 | 0.00 | 0.00 | 0.00 |
| MgO | 1.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |

TABLE 1-continued

|  | Example 1 | Example 2 | Example 3 | Example 4 | Example 5 | Example 6 |
|---|---|---|---|---|---|---|
|  |  |  |  |  |  | (Weight %) |
| $Ta_2O_5$ | 0.00 | 0.00 | 0.00 | 0.00 | 0.00 | 0.00 |
| $Al_2O_3$ | 0.00 | 0.00 | 0.00 | 0.00 | 0.00 | 0.00 |
| $Yb_2O_3$ | 0.00 | 0.00 | 0.00 | 0.00 | 0.00 | 0.00 |
| $Nb_2O_3$ | 0.00 | 0.00 | 0.00 | 0.00 | 0.00 | 0.00 |
| $As_2O_3$ | 0.00 | 0.00 | 0.00 | 0.00 | 0.00 | 0.00 |
| $Sb_2O_3$ | 0.00 | 0.00 | 0.00 | 0.30 | 0.00 | 0.00 |
| $GeO_2$ | 0.00 | 0.00 | 0.00 | 0.00 | 0.00 | 0.00 |
| $WO_3$ | 0.00 | 0.00 | 0.00 | 0.00 | 0.00 | 0.00 |

TABLE 2

|  | Example 7 | Example 8 | Example 9 | Example 10 | Example 11 | Example 12 |
|---|---|---|---|---|---|---|
|  |  |  |  |  |  | (Weight %) |
| $B_2O_3$ | 30.00 | 36.00 | 36.00 | 36.30 | 33.50 | 35.50 |
| $La_2O_3$ | 19.80 | 24.50 | 16.50 | 16.50 | 23.50 | 21.00 |
| $Y_2O_3$ | 0.00 | 0.00 | 0.00 | 0.00 | 0.00 | 1.00 |
| $SiO_2$ | 14.50 | 5.50 | 9.50 | 7.50 | 7.00 | 8.50 |
| $Li_2O$ | 5.00 | 4.00 | 4.00 | 4.30 | 4.00 | 4.50 |
| CaO | 10.50 | 10.00 | 10.30 | 11.40 | 9.50 | 10.50 |
| ZnO | 14.00 | 16.00 | 15.80 | 13.00 | 15.50 | 13.50 |
| $Cd_2O_3$ | 0.00 | 0.00 | 0.00 | 0.00 | 0.50 | 0.50 |
| $ZrO_2$ | 5.90 | 4.00 | 6.40 | 5.20 | 6.50 | 5.00 |
| $Na_2O$ | 0.00 | 0.00 | 0.00 | 0.50 | 0.00 | 0.00 |
| $K_2O$ | 0.00 | 0.00 | 0.00 | 0.50 | 0.00 | 0.00 |
| Na + K | 0.00 | 0.00 | 0.00 | 1.00 | 0.00 | 0.00 |
| MgO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.50 | 0.00 | 0.00 | 0.00 |
| $Ta_2O_5$ | 0.00 | 0.00 | 0.00 | 0.00 | 0.80 | 0.00 |
| $Al_2O_3$ | 0.30 | 0.00 | 0.00 | 0.00 | 0.00 | 0.00 |
| $Yb_2O_3$ | 0.00 | 0.00 | 0.00 | 0.00 | 0.00 | 0.00 |
| $Nb_2O_3$ | 0.00 | 0.00 | 0.00 | 0.00 | 0.00 | 0.00 |
| $As_2O_3$ | 0.00 | 0.00 | 0.00 | 0.00 | 0.00 | 0.00 |
| $Sb_2O_3$ | 0.00 | 0.00 | 0.00 | 0.00 | 0.00 | 0.00 |
| $GeO_2$ | 0.00 | 0.00 | 1.00 | 0.00 | 0.00 | 0.00 |
| $WO_3$ | 0.00 | 0.00 | 0.00 | 1.00 | 0.00 | 0.00 |

TABLE 3

|  | Comparative Example 1 | Comparative Example 2 | Comparative Example 3 |
|---|---|---|---|
|  |  |  | (Weight %) |
| $B_2O_3$ | 23.80 | 30.00 | 21.30 |
| $La_2O_3$ | 30.50 | 15.00 | 14.20 |
| $Y_2O_3$ | 0.00 | 0.00 | 0.00 |
| $SiO_2$ | 16.20 | 10.00 | 22.60 |
| $Li_2O$ | 5.20 | 5.00 | 5.30 |
| CaO | 10.60 | 5.00 | 8.70 |
| ZnO | 12.40 | 0.00 | 0.00 |
| $Cd_2O_3$ | 0.00 | 30.00 | 13.90 |
| $ZrO_2$ | 1.30 | 0.00 | 0.30 |
| $Na_2O$ | 0.00 | 0.00 | 3.30 |
| $K_2O$ | 0.00 | 0.00 | 0.00 |
| Na + K | 0.00 | 0.00 | 3.30 |
| MgO | 0.00 | 0.00 | 0.00 |
| SrO | 0.00 | 0.00 | 0.00 |
| BaO | 0.00 | 5.00 | 9.50 |
| $Ta_2O_5$ | 0.00 | 0.00 | 0.00 |
| $Al_2O_3$ | 0.00 | 0.00 | 0.90 |
| $Yb_2O_3$ | 0.00 | 0.00 | 0.00 |
| $Nb_2O_3$ | 0.00 | 0.00 | 0.00 |
| $As_2O_3$ | 0.00 | 0.00 | 0.00 |
| $Sb_2O_3$ | 0.00 | 0.00 | 0.00 |
| $GeO_2$ | 0.00 | 0.00 | 0.00 |
| $WO_3$ | 0.00 | 0.00 | 0.00 |

(Note)
In tables, "nd" represents refractive index (nd), and "vd" represents Abbe number (vd).

Tables 4 to 6 each show the composition of respective glass lumps (gobs) for precision press molding.

The refractive index and the Abbe number of each of the gobs were measured after annealing.

Measurement Method of Refractive Index

The glass was sand-polished to have a dimension of 10×10×5 mm, and the refractive indices thereof were measured at 587.6 nm (helium d-line), 486.1 nm (hydrogen F-line), and 656.3 nm (hydrogen C-line) with KPR2000 (trade name; manufactured by Shimadzu Corporation). Furthermore, the Abbe number was calculated from (nd-1)/(nF-nC).

Regarding the liquidus temperature, multiple platinum crucibles each loaded with glass were retained under different preset temperature conditions for 2 hours, and after that, the resultants were cooled and the inside of each glass was observed with a microscope. The temperature was determined from presence/absence of a crystal at that time.

TABLE 4

|  | Example 1 | Example 2 | Example 3 | Example 4 | Example 5 | Example 6 |
|---|---|---|---|---|---|---|
|  |  |  |  |  |  | (cat %) |
| $B^{3+}$ | 51.03 | 45.99 | 51.67 | 50.16 | 52.50 | 49.90 |
| $La^{3+}$ | 7.74 | 8.52 | 6.75 | 6.83 | 6.28 | 7.75 |
| $Y^{3+}$ | 0.00 | 0.00 | 0.00 | 0.00 | 0.00 | 0.00 |
| $Si^{4+}$ | 6.43 | 11.10 | 6.65 | 7.06 | 7.06 | 7.00 |
| $Li^+$ | 13.78 | 14.29 | 15.05 | 13.84 | 14.37 | 14.09 |
| $Ca^{2+}$ | 8.26 | 9.52 | 9.36 | 9.23 | 9.26 | 8.45 |
| $Zn^{2+}$ | 9.81 | 8.85 | 8.29 | 10.05 | 8.47 | 10.03 |
| $Cd^{3+}$ | 0.00 | 0.00 | 0.00 | 0.00 | 0.00 | 0.00 |
| $Zr^{4+}$ | 1.67 | 1.73 | 2.23 | 2.71 | 2.51 | 2.78 |
| Total of essential components | 98.72 | 100.0 | 100.00 | 99.89 | 100.00 | 100.00 |
| $Na^+$ | 0.00 | 0.00 | 0.00 | 0.00 | 0.00 | 0.00 |
| $K^+$ | 0.00 | 0.00 | 0.00 | 0.00 | 0.00 | 0.00 |
| $Na^+ + K^+$ | 0.00 | 0.00 | 0.00 | 0.00 | 0.00 | 0.00 |
| $Mg^{2+}$ | 1.28 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.00 | 0.00 | 0.00 | 0.00 |
| $Ta^{5+}$ | 0.00 | 0.00 | 0.00 | 0.00 | 0.00 | 0.00 |
| $Al^{3+}$ | 0.00 | 0.00 | 0.00 | 0.00 | 0.00 | 0.00 |

TABLE 4-continued

|  | Example 1 | Example 2 | Example 3 | Example 4 | Example 5 | Example 6 (cat %) |
|---|---|---|---|---|---|---|
| $Yb^{3+}$ | 0.00 | 0.00 | 0.00 | 0.00 | 0.00 | 0.00 |
| $Nb^{5+}$ | 0.00 | 0.00 | 0.00 | 0.00 | 0.00 | 0.00 |
| $As^{3+}$ | 0.00 | 0.00 | 0.00 | 0.00 | 0.00 | 0.00 |
| $Sb^{3+}$ | 0.00 | 0.00 | 0.00 | 0.11 | 0.00 | 0.00 |
| $Ge^{4+}$ | 0.00 | 0.00 | 0.00 | 0.00 | 0.00 | 0.00 |
| $W^{6+}$ | 0.00 | 0.00 | 0.00 | 0.00 | 0.00 | 0.00 |
| Total of optional components | 1.28 | 0.00 | 0.00 | 0.11 | 0.00 | 0.00 |
| $(Li^+)/(Zn^{2+})$ | 1.40 | 1.61 | 1.82 | 1.38 | 1.70 | 1.40 |
| $(Si^{4+})/(B^{3+})$ | 0.13 | 0.24 | 0.13 | 0.14 | 0.14 | 0.14 |
| Total | 100 | 100 | 100 | 100 | 100 | 100 |
| nd | 1.68895 | 1.68984 | 1.68372 | 1.68931 | 1.68011 | 1.69432 |
| vd | 53.78 | 53 | 54.6 | 52.6 | 53.76 | 52.48 |
| Liquidus temperature (° C.) | 960 | 950 | 920 | 930 | 890 | 930 |

TABLE 5

|  | Example 7 | Example 8 | Example 9 | Example 10 | Example 11 | Example 12 (cat %) |
|---|---|---|---|---|---|---|
| $B^{3+}$ | 43.69 | 53.00 | 51.61 | 51.75 | 50.49 | 51.07 |
| $La^{3+}$ | 6.64 | 7.71 | 5.05 | 5.94 | 7.57 | 6.46 |
| $Y^{3+}$ | 0.00 | 0.00 | 0.00 | 0.00 | 0.00 | 0.44 |
| $Si^{4+}$ | 12.24 | 4.69 | 7.89 | 6.19 | 6.11 | 7.09 |
| $Li^+$ | 16.97 | 13.72 | 13.36 | 14.28 | 14.04 | 15.08 |
| $Ca^{2+}$ | 9.49 | 9.14 | 9.17 | 10.09 | 8.89 | 9.38 |
| $Zn^{2+}$ | 8.72 | 10.08 | 9.69 | 7.93 | 9.99 | 8.31 |
| $Cd^{3+}$ | 0.00 | 0.00 | 0.00 | 0.00 | 0.14 | 0.14 |
| $Zr^{4+}$ | 2.43 | 1.66 | 2.59 | 2.09 | 2.77 | 2.03 |
| Total of essential components | 100.00 | 100.0 | 99.36 | 98.27 | 100.00 | 100.00 |
| $Na^+$ | 0.00 | 0.00 | 0.00 | 0.80 | 0.00 | 0.00 |
| $K^+$ | 0.00 | 0.00 | 0.00 | 0.53 | 0.00 | 0.00 |
| $Na^+ + K^+$ | 0.00 | 0.00 | 0.00 | 1.33 | 0.00 | 0.00 |
| $Mg^{2+}$ | 0.00 | 0.00 | 0.00 | 0.00 | 0.00 | 0.00 |
| $Sr^{2+}$ | 0.00 | 0.00 | 0.00 | 0.00 | 0.00 | 0.00 |
| $Ba^{2+}$ | 0.00 | 0.00 | 0.16 | 0.00 | 0.00 | 0.00 |
| $Ta^{5+}$ | 0.00 | 0.00 | 0.00 | 0.19 | 0.00 | 0.00 |
| $Al^{3+}$ | 0.00 | 0.00 | 0.00 | 0.00 | 0.00 | 0.00 |
| $Yb^{3+}$ | 0.00 | 0.00 | 0.00 | 0.00 | 0.00 | 0.00 |
| $Nb^{5+}$ | 0.00 | 0.00 | 0.00 | 0.00 | 0.00 | 0.00 |
| $As^{3+}$ | 0.00 | 0.00 | 0.00 | 0.00 | 0.00 | 0.00 |
| $Sb^{3+}$ | 0.00 | 0.00 | 0.00 | 0.00 | 0.00 | 0.00 |
| $Ge^{4+}$ | 0.00 | 0.00 | 0.48 | 0.00 | 0.00 | 0.00 |
| $W^{6+}$ | 0.00 | 0.00 | 0.00 | 0.21 | 0.00 | 0.00 |
| Total of optional components | 0.00 | 0.00 | 0.64 | 1.73 | 0.00 | 0.00 |
| $(Li^+)/(Zn^{2+})$ | 1.95 | 1.36 | 1.38 | 1.80 | 1.41 | 1.81 |
| $(Si^{4+})/(B^{3+})$ | 0.28 | 0.09 | 0.15 | 0.12 | 0.12 | 0.14 |
| Total | 100 | 100 | 100 | 100 | 100 | 100 |
| nd | 1.66228 | 1.69259 | 1.65816 | 1.67927 | 1.69482 | 1.68320 |
| vd | 54.18 | 53.66 | 53.35 | 53.05 | 52.32 | 53.52 |
| Liquidus temperature (° C.) | 980 | 920 | 950 | 960 | 960 | 930 |

TABLE 6

|  | Comparative Example 1 | Comparative Example 2 | Comparative Example 3 (cat %) |
|---|---|---|---|
| $B^{3+}$ | 37.15 | 49.47 | 33.08 |
| $La^{3+}$ | 10.17 | 5.28 | 4.71 |
| $Y^{3+}$ | 0.00 | 0.00 | 0.00 |
| $Si^{4+}$ | 14.65 | 9.55 | 20.33 |
| $Li^+$ | 18.91 | 19.21 | 19.17 |
| $Ca^{2+}$ | 10.27 | 5.12 | 8.38 |
| $Zn^{2+}$ | 8.28 | 0.00 | 0.00 |
| $Cd^{3+}$ | 0.00 | 9.50 | 4.41 |
| $Zr^{4+}$ | 0.57 | 0.00 | 0.13 |
| Total of essential components | 100.00 | 98.13 | 89.94 |
| $Na^+$ | 0.00 | 0.00 | 5.76 |
| $K^+$ | 0.00 | 0.00 | 0.00 |
| $Na^+ + K^+$ | 0.00 | 0.00 | 5.76 |
| $Mg^{2+}$ | 0.00 | 0.00 | 0.00 |
| $Sr^{2+}$ | 0.00 | 0.00 | 0.00 |
| $Ba^{2+}$ | 0.00 | 1.87 | 3.35 |
| $Ta^{5+}$ | 0.00 | 0.00 | 0.00 |
| $Al^{3+}$ | 0.00 | 0.00 | 0.95 |
| $Yb^{3+}$ | 0.00 | 0.00 | 0.00 |
| $Nb^{5+}$ | 0.00 | 0.00 | 0.00 |
| $As^{3+}$ | 0.00 | 0.00 | 0.00 |
| $Sb^{3+}$ | 0.00 | 0.00 | 0.00 |
| $Ge^{4+}$ | 0.00 | 0.00 | 0.00 |
| $W^{6+}$ | 0.00 | 0.00 | 0.00 |
| Total of optional components | 0.00 | 1.87 | 10.06 |
| $(Li^+)/(Zn^{2+})$ | 2.28 | — | — |
| $(Si^{4+})/(B^{3+})$ | 0.39 | 0.19 | 0.16 |
| Total | 100 | 100 | 100 |
| nd | 1.67860 | 1.68466 | 1.64638 |
| vd | 54.5 | 55.8 | 55.7 |
| Liquidus temperature (° C.) | 1,000> | 1,000> | 1,000> |

(Note)
In tables, "nd" represents refractive index (nd), and "vd" represents Abbe number (vd).

The optical glasses of Example 1 to Example 12 shown in Tables 4 to 6 each had a refractive index of 1.60 or more and 1.70 or less and an Abbe number of 50 or more and 56 or less. Furthermore, in all of the optical glasses of Example 1 to Example 12, striae and devitrification did not occur, and hence the optical glasses were satisfactory.

The present invention provides an optical glass having homogeneous optical characteristics such that striae and devitrification hardly occur at the time of producing a gob. Furthermore, the present invention provides an optical element obtained by subjecting the optical glass to homogeneous precision press molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-249026, filed Sep. 26, 2008, which is hereby incorporated by reference herein in its entirety.

The invention claimed is:

1. An optical glass comprising cationic components having the following composition and having a liquidus temperature of 800° C. or higher and lower than 1,000° C.:
   $Si^{4+}$ 3 cat % or more and 13 cat % or less
   $B^{3+}$ 40 cat % or more and less than 55 cat %
   $La^{3+}$ 4 cat % or more and 9 cat % or less
   $Ca^{2+}$ 6 cat % or more and 12 cat % or less
   $Li^+$ 11 cat % or more and 18 cat % or less
   $Zn^{2+}$ 6 cat % or more and 12 cat % or less
   $Zr^{4+}$ 1 cat % or more and 4 cat % or less
   $Y^{3+}$ 0 cat % or more and 0.5 cat % or less
   $Gd^{3+}$ 0 cat % or more and less than 0.3 cat %
   $Ba^{2+}$ 0 cat % or more and 0.5 cat % or less
   $Mg^{2+}$ 0 cat % or more and 2 cat % or less
   $Ge^{4+}$ 0 cat % or more and 1 cat % or less
   $Na^+ + K^+$ 0 cat % or more and 2 cat % or less
   $W^{6+}$ 0 cat % or more and 0.5 cat % or less
   $Ta^{5+}$ 0 cat % or more and 0.5 cat % or less
   $Sb^{3+}$ 0 cat % or more and 0.5 cat % or less
   $H^+$ 0 cat % or more and 10 cat % or less
   provided that $Si^{4+}/B^{3+}$ is 0.05 or more and 0.3 or less, and $Li^+/Zn^{2+}$ is 1.3 or more and 2.0 or less,
   the optical glass having a refractive index (nd) of 1.6 or more and less than 1.7 and an Abbe number (vd) of 50 or more and 56 or less.

2. The optical glass according to claim 1, wherein a total amount of $Si^{4+}$, $B^{3+}$, $La^{3+}$, $Ca^{2+}$, $Zn^{2+}$, $Li^+$, and $Zr^{4+}$ is 98 cat % or more.

3. An optical element comprising the optical glass according to claim 1.

4. A lens comprising the optical element according to claim 3.

5. A camera comprising the lens according to claim 4.

6. The optical glass according to claim 1, wherein the cationic components have the following composition:
   $Si^{4+}$ 5 cat % or more and 11 cat % or less
   $B^{3+}$ 45 cat % or more and less than 53 cat %
   $La^{3+}$ 5 cat % or more and 8 cat % or less
   $Ca^{2+}$ 8 cat % or more and 11 cat % or less
   $Li^+$ 12 cat % or more and 16 cat % or less
   $Zn^{2+}$ 7 cat % or more and 10 cat % or less
   $Zr^{4+}$ 1.5 cat % or more and 3 cat % or less
   $Y^{3+}$ 0 cat % or more and 0.5 cat % or less
   $Gd^{3+}$ 0 cat % or more and less than 0.3 cat %
   $Ba^{2+}$ 0 cat % or more and 0.5 cat % or less
   $Mg^{2+}$ 0 cat % or more and 2 cat % or less
   $Ge^{4+}$ 0 cat % or more and 1 cat % or less
   $Na^+ + K^+$ 0 cat % or more and 2 cat % or less
   $W^{6+}$ 0 cat % or more and 0.5 cat % or less
   $Ta^{5+}$ 0 cat % or more and 0.5 cat % or less
   $Sb^{3+}$ 0 cat % or more and 0.5 cat % or less
   $H^+$ 0 cat % or more and 10 cat % or less.

7. The optical glass according to claim 6, wherein the optical glass further comprises an anionic component selected from the group consisting of include $O^{2-}$, $OH^-$, $NO_x$ where X represents 1 to 3, and $SO_4^{2-}$.

8. The optical glass according to claim 7, wherein the optical glass does not contain, as cationic components, $As^{3+}$, $Pb^{2+}$, $Cd^{2+}$, and $F^-$.

* * * * *